(12) United States Patent
Kofman et al.

(10) Patent No.: US 11,885,562 B2
(45) Date of Patent: Jan. 30, 2024

(54) METHOD AND APPARATUS FOR ADSORPTIVE DISTILLATION FOR CRYOGENIC ARGON/OXYGEN SEPARATION

(71) Applicant: L'Air Liquide, Société Anonyme pour l'Etude et l'Exploitation des Procédés Georges Claude, Paris (FR)

(72) Inventors: Nicolas Kofman, Paris (FR); David Bednarski, Bures sur Yvette (FR); Bernard Saulnier, La Garenne Colombes (FR); Guillaume Cardon, Igny (FR); Mikael Wattiau, Palaiseau (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 492 days.

(21) Appl. No.: 17/191,402

(22) Filed: Mar. 3, 2021

(65) Prior Publication Data

US 2021/0278131 A1    Sep. 9, 2021

(30) Foreign Application Priority Data

Mar. 3, 2020  (FR) ...................................... 2002143

(51) Int. Cl.
*F25J 3/04* (2006.01)
*B01D 53/08* (2006.01)

(52) U.S. Cl.
CPC .......... *F25J 3/04733* (2013.01); *B01D 53/08* (2013.01); *F25J 3/044* (2013.01); *F25J 3/04636* (2013.01);

(Continued)

(58) Field of Classification Search
CPC ................ B01D 2253/25; B01D 53/08; B01D 2256/18; B01D 2257/104;

(Continued)

(56) References Cited

U.S. PATENT DOCUMENTS

| 3,996,028 A | 12/1976 | Golovko et al. |
| 5,159,816 A | 11/1992 | Kovak et al. |

(Continued)

FOREIGN PATENT DOCUMENTS

EP    0 750 933    1/1997

OTHER PUBLICATIONS

French Search Report for corresponding FR 2002143, dated Oct. 26, 2020.

*Primary Examiner* — Lionel Nouketcha
(74) *Attorney, Agent, or Firm* — Elwood L. Haynes

(57) ABSTRACT

In a method for separating argon by cryogenic distillation, in which a flow containing argon, oxygen and nitrogen and being more rich in argon than the air is sent to a distillation column, and an argon-rich gas flow is withdrawn at the top of the column, a portion of the argon-rich gas flow is mixed with beads to form a gas mixture containing beads, the beads being capable of adsorbing oxygen in the presence of argon at the column operating temperatures; the portion of the argon-rich gas flow mixed with the beads is condensed and then sent to the top of the column; and a bottom liquid containing beads is withdrawn from the column and treated to remove the beads, the beads removed being regenerated to remove the adsorbed oxygen and being again mixed with the argon-rich gas flow.

10 Claims, 4 Drawing Sheets

(52) U.S. Cl.
CPC .. *B01D 2253/108* (2013.01); *B01D 2253/204* (2013.01); *B01D 2253/25* (2013.01); *B01D 2256/18* (2013.01); *B01D 2257/102* (2013.01); *B01D 2257/104* (2013.01); *B01D 2259/40086* (2013.01); *C01B 2210/0034* (2013.01); *C01B 2210/0045* (2013.01); *C01B 2210/0046* (2013.01)

(58) Field of Classification Search
CPC .......... B01D 2259/40086; B01D 3/143; B01D 2257/102; F25J 3/04733; F25J 3/044; F25J 3/04636; C01B 2210/0046; C01B 2210/0034; C01B 2210/0045
See application file for complete search history.

(56) References Cited

U.S. PATENT DOCUMENTS

| | | | | |
|---|---|---|---|---|
| 5,220,797 | A | * | 6/1993 | Krishnamurthy ...... F25J 3/0285 62/620 |
| 5,685,172 | A | | 11/1997 | Darredeau et al. |
| 9,708,188 | B1 | | 7/2017 | Bhadra et al. |
| 2014/0249023 | A1 | * | 9/2014 | Barrett ................ C01B 23/0078 502/68 |

* cited by examiner

METHOD AND APPARATUS FOR ADSORPTIVE DISTILLATION FOR CRYOGENIC ARGON/OXYGEN SEPARATION

CROSS REFERENCE TO RELATED APPLICATIONS

This application claims the benefit of priority under 35 U.S.C. § 119 (a) and (b) to French Application No. 2002143, filed Mar. 3, 2020, the entire contents of which are incorporated herein by reference.

BACKGROUND

The present invention relates to a method and to an apparatus for adsorptive distillation for the cryogenic separation of a mixture of argon and oxygen.

Argon is presently produced by cryogenic distillation from an argon-enriched fluid obtained from the main low-pressure column. The supplementary column required for this separation is very high, because of the closeness of the boiling points of argon and oxygen (respectively −186° C. and −183° C. at $P_{atm}$).

This firstly entails high plant costs and secondly greatly limits the flexibility of the process: the restart time for the unit, from the launch of the condenser, for example, is about 24 hours. There is an alternative, "hot" argon process, where a standard-height column produces a gas containing 2-5% $O_2$, the remainder being burned by combustion with $H_2$. This solution is no less costly, requiring as it does (i) a source of $H_2$ and (ii) full heating, then cooling, of the gas.

SUMMARY

The invention described here enables a reduction in the number of plates or the quantity of packings in the argon-producing column, while maintaining the same entry/exit specifications. To achieve this, adsorbing microbeads with an $O_2$/Ar selectivity are suspended in the liquid.

The invention allows the number of theoretical plates in the distillation column to be reduced, thanks to the selective trapping of oxygen relative to argon by the beads. Although there is currently no adsorbent exhibiting high $O_2$/Ar selectivity at ambient temperature, the same is not true at cryogenic temperature. LTA4A, for example, possesses a selectivity of 5 to 87K, with the record being held by an MOF called CUK-1 which possesses a selectivity of 11 to 87K.

FIG. 1 illustrates the comparative adsorbed quantity $Q_{ads}$ of oxygen and argon at the pressure P at 87K isothermally, L1 indicates the adsorbed quantity $Q_{ads}$ of oxygen for CUK-1, L2 indicates the adsorbed quantity $Q_{ads}$ of argon for CUK-1, L3 indicates the adsorbed quantity $Q_{ads}$ of oxygen for LTA 4A, L4 indicates the adsorbed quantity $Q_{ads}$ of argon for LTA 4A.

We note that in contrast to the cases referred to above at ambient temperature, where the separation is controlled by the difference in equilibrium, adsorption on LTA 4A and CUK-1 is a result of steric exclusion. The definition used in this case for the selectivity, which makes more sense than the usual definition, is the ratio between the adsorbed quantities of oxygen and argon at the partial pressures of interest (here, for a 5% $O_2$-95% Ar mixture).

The current solutions for production of argon all start from an incoming stream at cryogenic temperature, composed of about 10% Ar and 90% $O_2$ ("argon bulge" of the main low-pressure column). Via these "hot" and "cold" argon processes it is possible to produce a gas composed of 1 ppm of $O_2$ and 0.5% of $N_2$ (the nitrogen can be removed by a small additional distillation column). We note also that there are alternative processes: (i) a process combining distillation, to produce a gas containing 2-5% of $O_2$, with cryogenic adsorption by TSA on LTA 4A, to finish the separation as described in U.S. Pat. No. 5,159,816, and (ii) a process performing the purification of liquid argon containing traces of $O_2$ to 1% by adsorption on the zeolite LTA 4A exchanged 42% with lithium as described in US2014/0245781 (the cation exchange enhances the performance of the liquid-phase adsorption).

FIG. 1 illustrates the oxygen and argon isotherms at 87K on MOF CUK-1 and LTA 4A.

EP0750933 describes a method according to the preamble of claim 1.

According to one subject of the invention, a method is provided for separating argon by cryogenic distillation, in which:
  a flow containing argon, oxygen and nitrogen and being more rich in argon than the air is sent to a distillation column, and
  an argon-rich gas flow is withdrawn at the top of the column,
characterized in that a portion of the argon-rich gas flow is mixed with beads having a diameter of less than 5 mm, preferably less than 100 µm, to form a gas mixture containing beads, the beads being made of an adsorptive material or coated with an adsorptive material, the adsorptive material being capable of adsorbing oxygen in the presence of argon at the column operating temperatures; the portion of the argon-rich gas flow mixed with the beads is condensed and then sent to the top of the column; and a bottom liquid containing beads is withdrawn from the column and treated to remove the beads, the beads removed being regenerated to remove the adsorbed oxygen and being again mixed with the portion of the argon-rich gas flow.

According to other, optional aspects, which are combinable with one another as far as is technically possible and logical:
  the gas mixture containing beads comprises less than 5 mass %, preferably less than 1.5 mass %, of beads.
  the bottom liquid is treated in a cyclone or filtered to remove the beads.
  the beads are regenerated by passing of a nitrogen gas flow between the beads at a temperature of greater than 90 K.
  the column contains structured packings or plates.
  the density of the beads differs by at most 10% from that of the condensed mixture.
  the beads are made of or carry a coating made of a material selected from the group of zeolite or organometallic material, for example LTA 4A or CUK-1.
  a liquid containing beads, which are made of an adsorptive material or coated with an adsorptive material, the adsorptive material being capable of adsorbing oxygen in the presence of argon at the column operating temperatures, is withdrawn at an intermediate level of the column, some at least of the beads being preferably saturated with oxygen.
  a liquid containing beads, which are made of an adsorptive material or coated with an adsorptive material, the adsorptive material being capable of adsorbing oxygen in the presence of argon at the column operating temperatures, is injected at an intermediate level of the column, some at least of the beads being preferably saturated with oxygen.

According to another subject of the invention, an apparatus is provided for separating argon by cryogenic distillation, comprising a distillation column, means for sending a flow containing argon, oxygen and nitrogen and being more rich in argon than the air to the distillation column, and means for withdrawing an argon-rich gas flow at the top of the column, characterized in that it comprises a mixer for mixing a portion of the argon-rich gas flow with beads having a diameter of less than 5 mm, or even less than 100 µm, to form a gas mixture containing beads, the beads being made of an adsorptive material or coated with an adsorptive material, the adsorptive material being capable of adsorbing oxygen in the presence of argon at the column operating temperatures, a condenser for condensing the mixture and a line for sending the condensed mixture from the condenser to the top of the column, a line for withdrawing a bottom liquid containing beads from the column, a device for separating the beads from the bottom liquid, a regeneration apparatus for regenerating the separated beads to remove the adsorbed oxygen, and a line for sending the regenerated beads to the mixer.

The apparatus preferably comprises a line for sending a liquid containing argon and regenerated beads and optionally oxygen to an intermediate level of the column.

The apparatus preferably comprises a line for withdrawing a liquid containing argon and beads for regeneration and optionally oxygen connected at an intermediate level of the column.

Optionally, a single line may be used for sending the liquid containing argon and regenerated beads and optionally oxygen to an intermediate level of the column and for withdrawing a liquid containing argon and beads for regeneration and optionally oxygen at the same level.

The line or lines are connected to means for regenerating the beads.

The apparatus preferably comprises a filter or a cyclone for separating the beads from the bottom liquid.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 2:
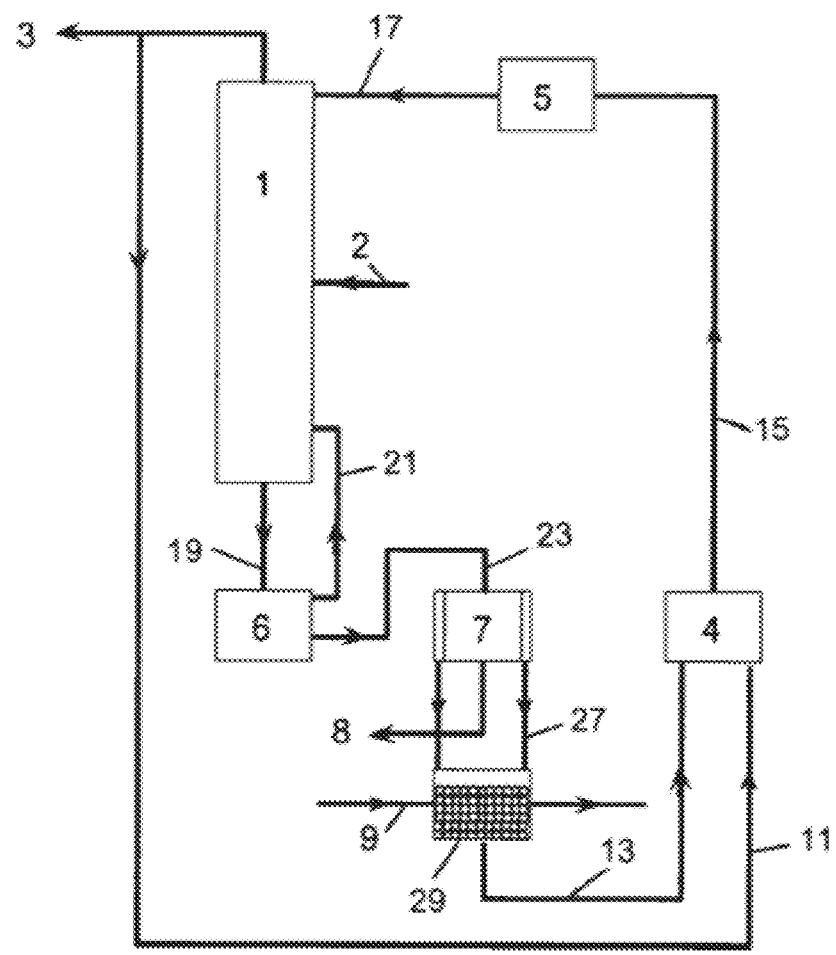
FIG. 2 illustrates a hybrid distillation/adsorption method according to the invention.

FIG. 2 illustrates a hybrid distillation/adsorption method, this being advantageous from the standpoint of integration of the elements. A distillation column 1 is employed which comprises a reduced number of plates or a reduced quantity of packings relative to the pure distillation case. Plates are preferred for this method, having as they do a smaller number of gaps between them in which the beads could get lodged, relative to packings.

A gas stream 2 at cryogenic temperature, composed for example of 10% Ar-90% $O_2$ and traces of nitrogen, is injected into the column 1. The entry position depends on the composition of the stream and may be at the bottom of the column 1 or at an intermediate point. This stream 2 typically originates from the low-pressure column of a double air separation column. An argon gas stream comprising 1 ppm of $O_2$ and 0.5% of $N_2$ is withdrawn at the top of the column 1. A small portion of this stream makes up the product 3, with the great majority 11 being redirected to a mixer 4. Within said mixer, regenerated adsorbent microbeads are mixed effectively into the argon gas stream. The beads have a diameter of less than 5 mm, or even less than 100 µm. The stream 15, consisting of the mixture of beads and argon gas, then passes into a condenser 5, and is subsequently reinjected in a liquid form, mixed with the beads 17, at the column top. The beads take on $O_2$ as they descend the column 1: they are regenerated in the bottom part of the column 1. The bottom liquid 19 from the column is sent to a reboiler 6, which partially evaporates the bottom liquid. The gas 21 formed is returned to the column 1, at the bottom. The unevaporated liquid 23 from the boiler 6 is sent to a cyclone-type separator 7. An impure liquid $O_2$ stream 8 is recovered in the centre of the separator 7, whereas the suspended beads 27 are ejected towards the outer part of the cyclone. They are then regenerated by an $N_2$ gas stream 9 at a temperature greater than 90K in a regeneration device 29, before passing into the mixer 4 as stream 13.

The beads can also be separated from their surrounding liquid by filtration. They are preferably separated by two filters operating intermittently. While one filter separates the beads, the other may be cleared by a center-current gas flow, enabling recovery of the beads.

In this method, the typical size of the adsorbent beads is of the order of 10 µm, so as to be very much smaller than the typical thickness of the film of liquid in the packings (100 µm). Moreover, the beads are highly diluted in the liquid 17 (mass fraction of beads of the order of 1%) and so do not disrupt the flow of liquid in the packings or plates. To ensure an even distribution of the beads in the liquid, the density selected for them is close to that of the liquid (~1250 kg/m³). The corresponding density of the bed of adsorbent is then about 800 kg/m³. Their small size also ensures effective transport by the argon gas stream.

They may for example be beads made of CUK-1 or LTA 4A or may carry a coating of CUK-1 or LTA 4A. These beads with a coating are "inert-core beads". In PSA adsorption methods, they can limit head losses while maintaining a good adsorption capacity (as the core of a 100% adsorbent bead does not work if the kinetics are "slow"). In this case, the fact that the body of the bead is made of a material different from that of the coating allows the density of the beads to be adapted to that of the liquid, by selection of the right material.

The beads may be withdrawn and/or injected at intermediate positions, according to the height of the column 1. This is because, firstly, the beads are saturated below a certain height and thus no longer capture oxygen.

The column 1, the mixer 4, the separation means 7 and the regeneration means 29 are arranged within an insulated cold box (not illustrated).

Figure 4:
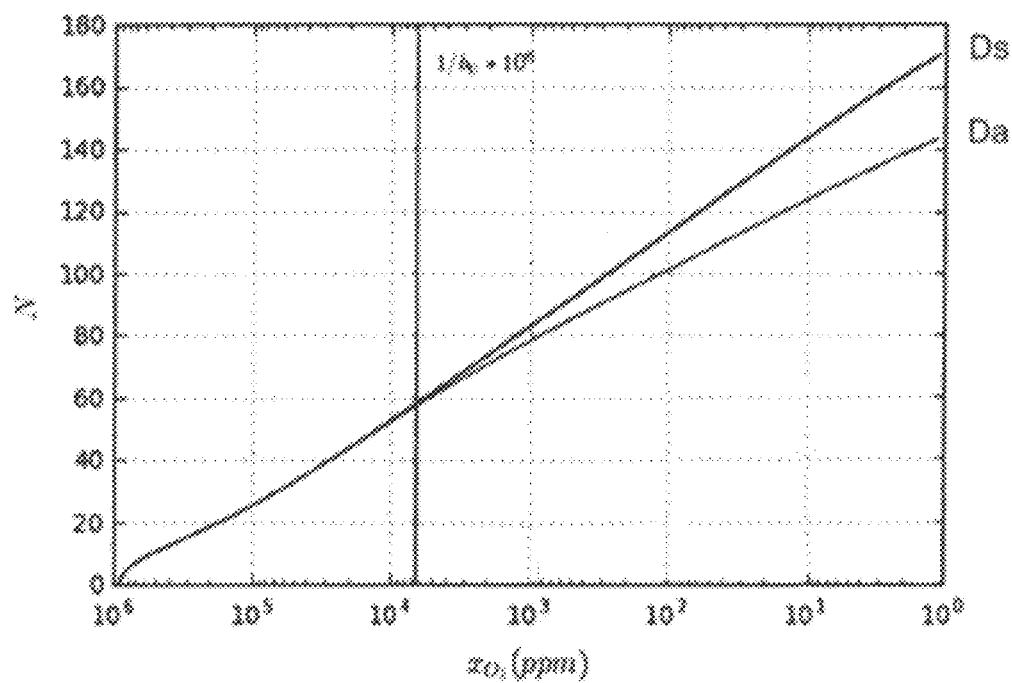
FIG. 4 shows the change in oxygen content in the column depending on the number N of plates in the column.

FIG. 4 illustrates, indeed, that between the bottom of the column and the sixtieth plate, counting from the bottom, for a column with 180 plates, the adsorptive distillation (Da) is less effective than the non-adsorptive distillation (Ds), since the beads lose their adsorption capacity starting from this level, and adsorption in the lower part is less effective. Hence it is seen that the quantity of oxygen in the column, in ppm, is greater for the non-adsorptive distillation for the plates between the 60th and the 180th, whereas the performance is equivalent for plates 1 to 60.

Secondly, even if the beads are not saturated, through withdrawing and/or injecting the beads at an intermediate position it is possible to regain effectiveness in the lower part of the column.

It is possible in this way to manipulate the distillation if purities are observed to be out of line with requirements.

In this case, the beads will be withdrawn with a liquid having a composition which is that of the intermediate point in the column; the beads are subsequently separated, for example by cyclone or by filtration, and regenerated. The regenerated beads taken at intermediate height from the column can be reinjected at the top of the column and/or at an intermediate point in the column. In the case of reinjection at an intermediate point, it will be necessary to ensure that the composition of the liquid injected with the beads is equivalent to that of the liquids within the column from the injection point.

Given their low proportion in the liquid, the energy cost of regenerating the adsorbent beads is small against the backdrop of the overall cost of producing liquid argon, which is about 5 kWh/Nm$^3$.

Figure 1:
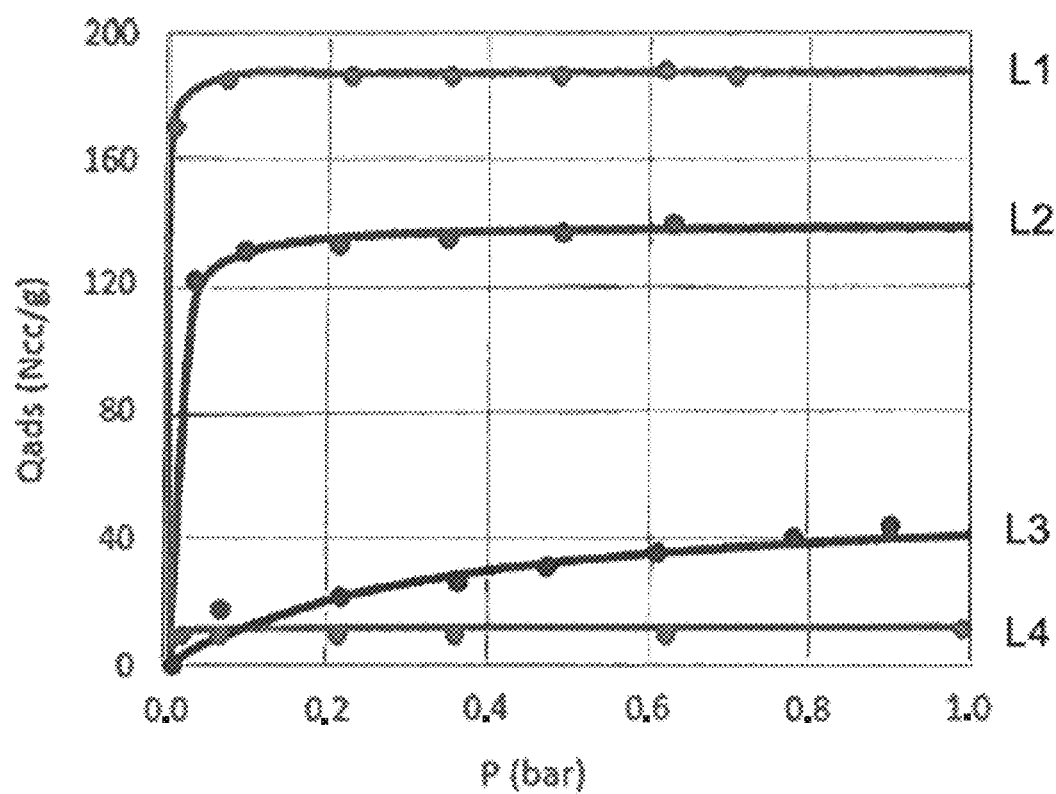
FIG. 1 schematically illustrates the oxygen and argon isotherms at 87K on MOF CUK-1 and LTA 4A.

We are not aware of any measurements in the literature of liquid-phase isotherms for the system $O_2$/Ar (the data presented in FIG. 1 is in the gas phase). It is therefore appropriate to look into the possible extension of the performance observed in the gas phase to the point of liquid-vapour equilibrium. Assuming the adsorption of argon to be very low and the $O_2$ concentrations present to be small, we hypothesize that the Langmuir model remains valid (highly dilute solution). It should be expected that the quantities adsorbed in liquid phase are lower than those in gas phase, because the energy of liquid-liquid interaction (enthalpy of vaporization: ~7 kJ/mol) is no longer very much lower than the enthalpy of adsorption (energy of gas-solid interaction: ~30 kJ/mol). For comparison, the energy of gas-gas interaction is for its part about 1 kJ/mol.

Using these hypotheses, the possible gain in terms of number of theoretical plates as a function of the properties of the adsorbent has been evaluated using an approach of the McCabe-Thiele kind. To go from 1% to 1 ppm of $O_2$, the number of plates goes from N=120 (in the absence of beads) to N=90 (with the properties of CUK-1). The gain in terms of number of plates may be enhanced by increasing the mass fraction of beads (in which case the energy cost entailed by regeneration of the beads also increases).

The height H of the distillation column is expressed as a function of the number of theoretical plates $N_{plat}$ and of the Height Equivalent to a Theoretical Plate, HETP:

$$H = HETP \times N_{plat}$$

The HETP is dependent in turn on the liquid-vapour equilibrium curve and on the mass transfer properties on the gas and liquid sides. We are assuming that the slope of the liquid-vapour equilibrium curve m remains unchanged: no modification of the intermolecular forces by the beads (highly dilute suspension). The interfacial area $a_e$ and the liquid-side transfer coefficient $k_L$ are also assumed to remain unchanged (no accumulation of beads at the interface).

Accordingly, the beads are assumed to act simply as a reservoir of matter, and their effect on the number of theoretical plates can be estimated on the basis of the McCabe-Thiele construction. This construction assumes the heat of vaporization to be independent of the composition of the mixture.

Indeed, then:

$$\Delta H(Ar) = 68 \sim \Delta H(O_2) = 71 \text{ kcal/Nm}^3 \quad \text{Math 1}$$

The relative volatility α is in turn taken to be variable with the composition X of the mixture, according to the following relationship:

$$\alpha = 1.5 - 0.4 X_{liq}(Ar) \quad \text{Math 2}$$

The reflux ratio R=L|D is taken to be 50, so that the number of theoretical plates to go from 90% of $O_2$ to 1 ppm is 170 (consistent with reality). 50 plates are needed to go from 90% to 1%, and 120 plates to go from 1% to 1 ppm.

Figure 3A:
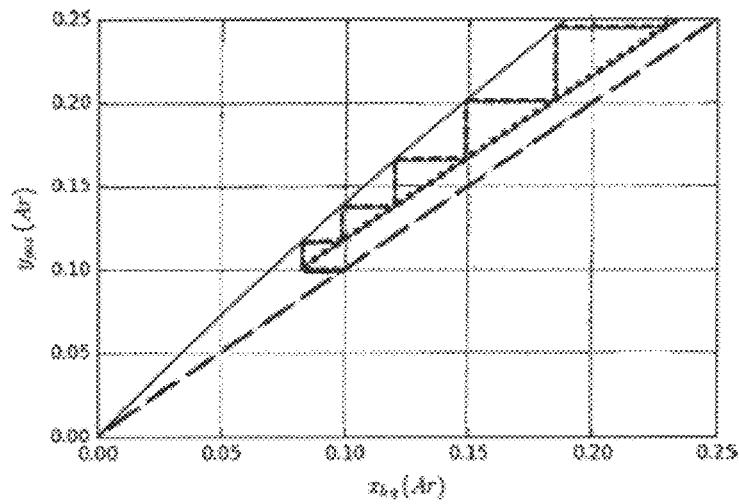
FIG. 3A illustrates the McCabe-Thiele diagram for ordinary distillation.
Figure 3B:
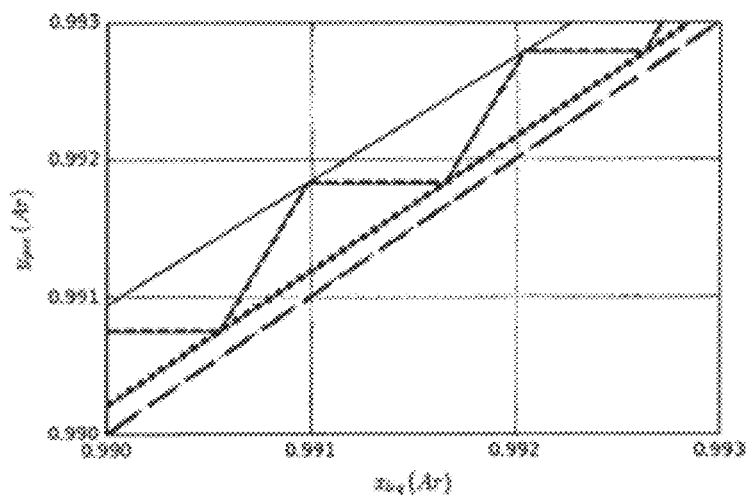
FIG. 3B illustrates the McCabe-Thiele diagram for adsorptive distillation for a column operating according to the invention.

To move within the McCabe-Thiele diagram, an additional step is added, further to the travel between the operating line and the equilibrium curve and back: this step involves reducing the molar fraction of argon in the liquid as a function of the quantities adsorbed at the argon-oxygen equilibrium. FIG. 3 comprises a FIG. 3A illustrating the McCabe-Thiele diagram for ordinary distillation, comparing the quantities of argon in the gas and the liquid, and a FIG. 3B illustrating the McCabe-Thiele diagram for adsorptive distillation, comparing the quantities of argon in the gas and the liquid. In FIG. 3A, the line illustrates the feed at 0.10 in the gas.

The solid line indicates the equilibrium line, the asterisked line the operating line, the zigzag line between the two the McCabe-Thiele line, the line of long lines the line y=x, and the line of small ovals the feed.

Math 3

$$X'_{liq}(Ar) = \frac{X_{liq}(Ar) - q(Ar) x_S M_{tot}}{1 - [q(O_2) + q(Ar)] x_S M_{tot}}$$

In the above expression, $x_s$ is the mass fraction of beads in the liquid and $M_{tot}$ is the molar mass of the mixture. The adsorbed quantities of Ar, q(Ar), and of $O_2$, q($O_2$), are assumed to follow the Langmuir model.

[Math 4

$$q = \frac{q_{sat} b X}{1 + bX}$$

where $q_{sat}$ is the quantity adsorbed at saturation, b is the equilibrium constant and X is the impurity content.

The coefficients of the model for CUK-1 at 87 K are given in the table below.

TABLE 1

|  | $q_{sat}$ (Ncc/g) | b (~) |
|---|---|---|
| Argon | 12 | 150 |
| Oxygen | 140 | 150 | where $q_{sat}$ is the quantity adsorbed at saturation and b is the equilibrium constant.

The number of plates is calculated by stepwise travel within the diagram, and the quantities newly adsorbed at each plate are calculated by difference between the equilibrium quantities and those already adsorbed at the preceding plates.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for separating argon by cryogenic distillation, in which:
 a flow containing argon, oxygen and nitrogen and being richer in argon than the air is sent to a distillation column, and
 an argon-rich gas flow is withdrawn at the top of the column,
comprising, mixing a portion of the argon-rich gas flow with beads having a diameter of less than 5 mm to form a gas mixture containing beads, the beads being made of an adsorptive material or coated with an adsorptive material, the adsorptive material being capable of adsorbing oxygen in the presence of argon at the column operating temperatures; condensing the portion of the argon-rich gas flow mixed with the beads and then sending the condensed portion to the top of the column; and withdrawing a bottom liquid containing beads from the column and treating the withdrawn liquid to remove the beads, regenerating the beads removed to remove the adsorbed oxygen and mixing the regenerated beads with the portion of the argon-rich gas flow.

2. The method according to claim 1, in which the gas mixture containing beads comprises less than 5 mass % of beads.

3. The method according to claim 1, in which the bottom liquid is treated in a cyclone or filtered to remove the beads.

4. The method according to claim 1, in which the beads are regenerated by passing a nitrogen gas flow between the beads at a temperature of greater than 90 K.

5. The method according to claim 1, wherein the column contains structured packings or plates.

6. The method according to claim 1, wherein the density of the beads differs by at most 10% from that of the condensed mixture.

7. The method according to claim 1, wherein the beads are made of or carry a coating made of a material selected from the group of zeolite or organometallic material.

8. The method according claim 1, wherein a liquid containing beads, which are made of an adsorptive material or coated with an adsorptive material, which is configured to absorb oxygen in the presence of argon at the column operating temperatures, is withdrawn at an intermediate level of the column.

9. The method according to claim 1, wherein a liquid containing beads, which are made of an adsorptive material or coated with an adsorptive material, the adsorptive material being configured to absorb oxygen in the presence of argon at the column operating temperatures, is injected at an intermediate level of the column.

10. An apparatus for separating argon by cryogenic distillation, comprising a distillation column, a means for sending a flow containing argon, oxygen and nitrogen and being more rich in argon than the air to the distillation column, and a means for withdrawing an argon-rich gas flow at the top of the column,
 further comprising a mixer for mixing a portion of the argon-rich gas flow with beads having a diameter of less than 5 mm to form a gas mixture containing beads, the beads being made of an adsorptive material or coated with an adsorptive material, the adsorptive material being configured to absorb oxygen in the presence of argon at the column operating temperatures, a condenser for condensing the mixture and a line for sending the condensed mixture from the condenser to the top of the column, a line for withdrawing a bottom liquid containing beads from the column, a device for separating the beads from the bottom liquid, a regeneration apparatus for regenerating the separated beads to remove the adsorbed oxygen, and a line for sending the regenerated beads to the mixer.

* * * * *